US010042277B2

(12) United States Patent
Bar-Haim et al.

(10) Patent No.: US 10,042,277 B2
(45) Date of Patent: Aug. 7, 2018

(54) ELECTROSTATIC INK COMPOSITIONS

(71) Applicant: HP Indigo B.V., Amstelveen (NL)

(72) Inventors: Gil Bar-Haim, Holon (IL); Alexey S. Kabalnov, San Diego, CA (US); Albert Teishev, Rishon le-zion (IL); Alina Grishman, Rehovot (IL); Vladislav Kaploun, Rehovot (IL); Danny Feldman, Nes Ziona (IL); Eyal Bachar, Modiin (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/314,362

(22) PCT Filed: Jun. 9, 2014

(86) PCT No.: PCT/EP2014/061943
§ 371 (c)(1),
(2) Date: Nov. 28, 2016

(87) PCT Pub. No.: WO2015/188844
PCT Pub. Date: Dec. 17, 2015

(65) Prior Publication Data
US 2017/0146920 A1    May 25, 2017

(51) Int. Cl.
*G03G 9/12* (2006.01)
*G03G 9/13* (2006.01)
(Continued)

(52) U.S. Cl.
CPC .......... *G03G 9/122* (2013.01); *C09D 11/037* (2013.01); *C09D 11/107* (2013.01); *G03G 9/131* (2013.01);
(Continued)

(58) Field of Classification Search
CPC ......... G03G 9/122; G03G 9/131; G03G 13/10
See application file for complete search history.

(56) References Cited

U.S. PATENT DOCUMENTS 2,844,581 A  *  7/1958  Manger .................. C09B 48/00
                                                106/402
3,074,950 A  *  1/1963  Deuschel ............... C09B 48/00
                                                106/497
(Continued)

FOREIGN PATENT DOCUMENTS

EP    1167469    1/2002
EP    1804127    7/2007
(Continued)

OTHER PUBLICATIONS

English language machine translation of JP 2007-093735 (Apr. 2007).*

(Continued)

*Primary Examiner* — Christopher D Rodee
(74) *Attorney, Agent, or Firm* — Dierker & Kavanaugh PC

(57) ABSTRACT

Herein is disclosed a magenta liquid electrostatic ink composition comprising chargeable particles comprising a resin, a pigment, a liquid carrier in which the chargeable particles are dispersed, and a charge director, wherein the resin is formable from polymerizing alkylene monomers and methacrylic or acrylic acid monomers, the pigment is selected from pigment violet 19 type $\alpha^I$ pigment violet 19 type $\alpha^{II}$ pigment violet 19 type β, pigment violet 19 type γ, pigment red 177, pigment red 208, pigment red 122 and pigment violet 32, and the liquid electrostatic ink composition lacks any other types of pigment. Also disclosed herein is a method of electrostatic printing and a print substrate having printed thereon the magenta liquid electrostatic ink composition.

8 Claims, 3 Drawing Sheets

(51) Int. Cl.
*C09D 11/037* (2014.01)
*C09D 11/107* (2014.01)
*G03G 9/135* (2006.01)
*G03G 13/10* (2006.01)

(52) U.S. Cl.
CPC ............. *G03G 9/135* (2013.01); *G03G 13/10* (2013.01); *G03G 2215/0629* (2013.01)

(56) References Cited

U.S. PATENT DOCUMENTS

| | | | | |
|---|---|---|---|---|
| 4,017,496 | A * | 4/1977 | Hanke | C09B 48/00 106/495 |
| 4,247,696 | A * | 1/1981 | Shibata | C07D 471/04 106/497 |
| 4,886,726 | A * | 12/1989 | Chan | G03G 9/135 430/115 |
| 5,223,624 | A * | 6/1993 | Babler | C09B 48/00 106/497 |
| 5,626,662 | A * | 5/1997 | Urban | C09B 67/0002 106/31.28 |
| 5,755,872 | A * | 5/1998 | Urban | C09B 48/00 106/493 |
| 6,218,066 | B1 * | 4/2001 | Zhao | G03G 9/09758 430/114 |
| 6,241,814 | B1 * | 6/2001 | Urban | C09B 48/00 106/495 |
| 6,312,512 | B1 * | 11/2001 | Urban | C09B 48/00 106/31.77 |
| 6,323,342 | B1 * | 11/2001 | Babler | C09B 48/00 106/497 |
| 6,455,215 | B1 | 9/2002 | Hashimoto et al. | |
| 6,524,379 | B2 | 2/2003 | Nohr et al. | |
| 6,667,140 | B2 | 12/2003 | Tosaka et al. | |
| 7,101,428 | B2 * | 9/2006 | He | C07D 471/04 106/31.77 |
| 7,132,012 | B2 | 11/2006 | Tateishi et al. | |
| 7,195,814 | B2 * | 3/2007 | Ista | D04H 13/02 428/292.1 |
| 7,323,045 | B2 | 1/2008 | Hanmura et al. | |
| 8,021,815 | B2 * | 9/2011 | Akioka | G03G 9/125 430/114 |
| 2002/0102485 | A1 | 8/2002 | Abe et al. | |
| 2006/0075925 | A1 * | 4/2006 | Stoffel | C09D 11/322 106/31.27 |
| 2006/0235066 | A1 * | 10/2006 | Morinaga | A01N 43/56 514/406 |
| 2007/0125263 | A1 * | 6/2007 | Weber | C08K 5/0041 106/31.81 |
| 2009/0142690 | A1 | 6/2009 | Awamura et al. | |
| 2010/0010121 | A1 * | 1/2010 | Koganehira | C09D 11/322 524/90 |
| 2010/0043670 | A1 * | 2/2010 | Shiono | C09D 11/40 106/31.6 |
| 2010/0062161 | A1 * | 3/2010 | Shiono | C09D 11/322 427/256 |
| 2011/0132228 | A1 * | 6/2011 | Shiono | C09D 11/40 106/31.13 |
| 2011/0209643 | A1 * | 9/2011 | Thompson | C09B 67/0027 106/495 |
| 2011/0223528 | A1 | 9/2011 | Ohno et al. | |
| 2011/0300298 | A1 * | 12/2011 | Kamibayashi | C09D 11/38 427/256 |
| 2011/0318684 | A1 * | 12/2011 | Nakamura | G03G 9/092 430/108.1 |
| 2012/0126184 | A1 * | 5/2012 | Vairon | C08K 5/0041 252/582 |
| 2012/0156449 | A1 * | 6/2012 | Tateishi | C09B 33/12 428/195.1 |
| 2013/0004891 | A1 | 1/2013 | Nagasawa et al. | |
| 2013/0164667 | A1 | 6/2013 | Kamiwaki et al. | |
| 2013/0288177 | A1 * | 10/2013 | Ganapathiappan | G03G 9/16 430/137.22 |
| 2016/0130460 | A1 * | 5/2016 | Ron | C09D 105/00 524/56 |
| 2016/0370726 | A1 * | 12/2016 | Zhao | C09D 11/037 |
| 2017/0088714 | A1 * | 3/2017 | Ganapathiappan | C09D 11/106 |

FOREIGN PATENT DOCUMENTS

| | | | |
|---|---|---|---|
| EP | 2216376 | | 8/2010 |
| GB | 1002641 | * | 8/1965 |
| JP | S649466 | | 1/1989 |
| JP | 05142867 A | * | 6/1993 |
| JP | 2003238871 | | 8/2003 |
| JP | 2007093735 A | * | 4/2007 |
| JP | 2007286148 | | 11/2007 |
| JP | 2011099047 | | 5/2011 |
| JP | 2013068743 | | 4/2013 |
| WO | WO-2013/107498 | | 7/2013 |
| WO | WO-2013/107523 | | 7/2013 |

OTHER PUBLICATIONS

Diamond, A.S.; Weiss, D.S. eds. Handbook of Imaging Materials. Marcel-Dekker, Inc. (2002) pp. 242-257.*
English language translation of JP 05-142867 (Jun. 1993).*
Fiche De Donnees De Securitee—HP ElectroInk 4.0 Magenta Q4014B—Version 6—Aug. 7, 2011, 5 pgs.
Fiche De Donnees De Securite—HP Electrolnk Light Magenta Q4046A—Version 7—Aug. 18, 2011, 5 pgs.
Fiche De Donnees De Securite—HP Electrolnk Magenta for HP Indigo 7000 Digital Press Q4058C—Version 3—Sep. 10, 2007, 5 pgs.
Fiche De Donnees De Securite—HP Electrolnk Magenta for use with HP Indigo Digital Press 10000 Q4201A—Version 4—Mar. 20, 2014, 8 pgs.
International Search Report and Written Opinion for International Application No. PCT/EP2014/061943 dated Aug. 5, 2014, 9 pages.
Paulus et al, 'Crystal structures of quinacridones', CrystEngComm, 2007, vol. 9, pp. 131-143.
Product Data Sheet—5280-68-2—http://www.chemicalbook.com/CASEN_5280-68-2.html—Mar. 28,2014.
Product Data Sheet—Permanent Carmine FBB 02 http://www.pigments.clariant.com/bu/pigments/PDS_Pigments.nsf/www/DS-OSTS-7SHDRW?open.
Product Data Sheet—Pigment red 122—http://www.chemicalbook.com/ChemicalProductProperty_EN_CB1512302.htm.
Product Data Sheet—Pigment red 177—http://www.xcolorpigment.com/pigment-red-177.html.
Product Data Sheet—Pigment violet 32—http://www.dyestuffintermediates.com/pigment-dye/pigment-violet-32.html, 4 pgs.
Wikipedia entry—Quinacridone—http://en.wikipedia.org/wiki/Quinacridone, 3 pgs.

* cited by examiner

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

DETAILED DESCRIPTION

Figure 1:
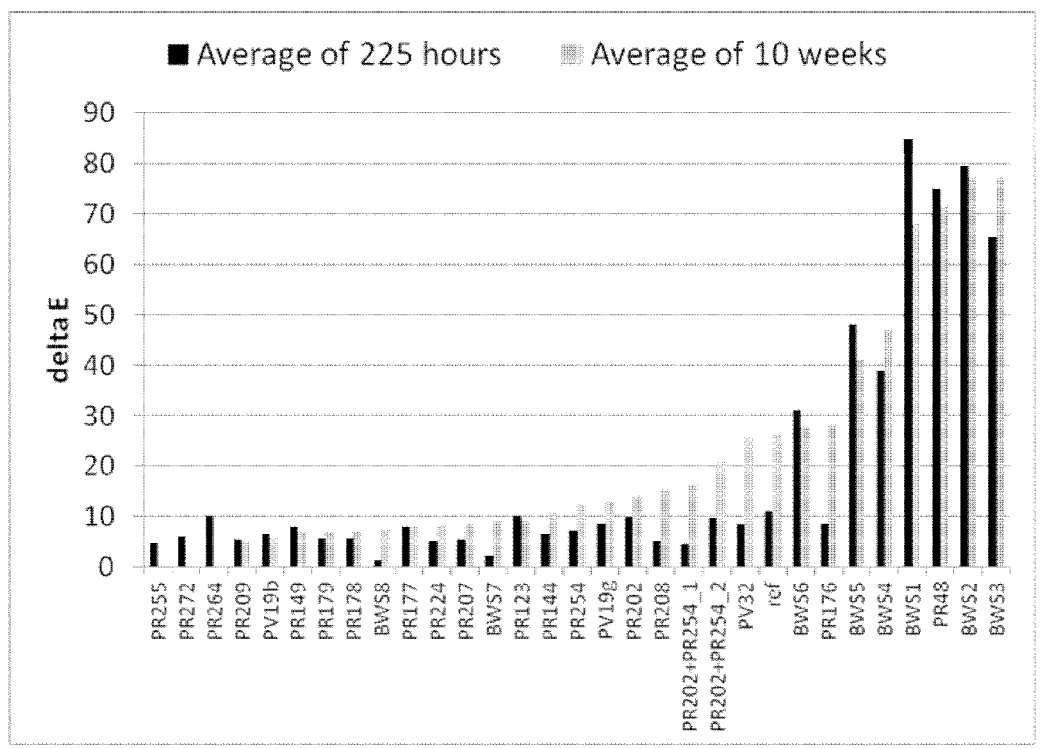
FIG. 1 shows results of the synthetic print samples in both accelerated (left-hand bar) and real-time tests (right-hand bar). The electrostatic ink pigments are ordered based on their results in Blue Wool Scale (BWS) grading.

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of the resin and the pigment dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided a magenta liquid electrostatic ink composition comprising:
chargeable particles comprising a resin, a pigment,
a liquid carrier in which the chargeable particles are dispersed, and
a charge director, wherein
the resin is formable from polymerising alkylene monomers and methacrylic or acrylic acid monomers,
the pigment is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

In some examples, the liquid electrostatic ink composition lacks any other types of pigment, i.e. any other type of pigment other than pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32. In some examples, the electrostatic ink composition contains a single pigment or a plurality of pigments selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32. In some examples, the electrostatic ink composition contains only two types of pigment, and the two types of pigment are selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

Some magenta pigments used in electrostatic ink compositions are not as light-fast as desired for some applications, particularly applications in which the printed inks are exposed to UV rays outside. Embodiments of the inks described herein, after significant research, were found to have reasonable light-fast properties, particularly to UV rays. Without being bound by theory, it is believed that these pigments have higher lightfastness permanence, in part, because of their delocalized ring systems (and higher density of states, DOS). Embodiments of the inks printed with the pigments described herein have also been found to have a reasonably close color match to a particular reference pigment (a combination of a primary pigment, pigment red 146, pigment red 185 and a secondary pigment, pigment red 122). The pigments described herein also have reasonable compatibility with the resin described herein and did not seem to produce any adverse effects in electrostatic printing (apart from a charging increase), which can sometimes be observed when pigments are exposed to the high potentials and other harsh conditions used in electrostatic printing. In some instances, the pigments improved the ease with which the resin particles could be charged, so less charge director or charge adjuvant could be used, compared to a reference magenta ink.

Method of Forming an Electrostatic Ink Composition

Also provided in an aspect is an the electrostatic ink formable by the method described herein. Also provided herein is a method of producing an electrostatic ink composition, the method involving:
producing chargeable particles comprising a resin;
and, before, during or after the chargeable particles comprising the resin are produced, combining the resin with (i) a charge director,
(ii) a liquid carrier,
(iii) a pigment selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32, and, in some examples,
(iv) no other types of pigment. "No other types of pigment" indicates no types other than a pigment selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

Method of Electrostatic Printing

In another aspect there is provided a method of electrostatic printing, the method comprising:
a) providing a magenta liquid electrostatic ink composition;
b) contacting the electrostatic ink composition with a latent electrostatic image on a surface to create a developed image,
c) transferring the developed image to a print substrate, wherein the magenta liquid electrostatic ink composition comprises:
chargeable particles comprising a resin, a pigment,
a liquid carrier in which the chargeable particles are dispersed, and
a charge director, wherein
the resin is formable from polymerising alkylene monomers and methacrylic or acrylic acid monomers,
the pigment is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32,
and, in some examples, the liquid electrostatic ink composition lacks any other types of pigment (i.e. any types other than those listed in this aspect).

Electrostatic Ink Compositions

In some examples, the total solids of the magenta liquid electrostatic ink composition comprises, consists of, or consists essentially of:
a) 1-45 wt % of a pigment (of total solids), wherein the pigment is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32; and
b) 40-90 wt % of one or more resins (of total solids);
c) 0.02-20 wt % of one or more charge directors;
d) in some examples, up to 10 wt % of other additives (of total solids), wherein other additives lacks any other types of pigment. In some examples, component d) may be defined as "up to 5 wt % of other additives (of total solids), wherein other additives lacks any other types of pigment", in some examples "up to 3 wt % of other additives (of total solids), wherein other additives lacks any other types of pigment", in some examples "up to 2 wt % of other additives (of total solids), wherein other additives lacks any other types of pigment".

In some examples, the magenta liquid electrostatic ink composition comprises, consists of, or consists essentially of, in terms of the total amount of the electrostatic ink composition:
a) 0.02-0.9 wt % of a pigment, wherein the pigment is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32; and
b) 0.8-1.8 wt % of one or more resins;
c) 0.0004-0.4 wt % of one or more charge directors;
d) in some examples, up to 0.2 wt % of other additives, wherein other additives lacks any other types of pigment,
e) the remaining wt % being a liquid carrier.

In some examples, the solids of the magenta liquid electrostatic ink composition comprises, consists of, or consists essentially of 10-40 wt % of the pigment, in some examples 10-35 wt % of the pigment, in some examples 10-30 wt % of the pigment, in some examples 20-30 wt % of the pigment. In some examples, the solids of the magenta liquid electrostatic ink composition comprises, consists of, or consists essentially of 11-23 wt % of the pigment. In some examples, the solids of the magenta liquid electrostatic ink composition comprises, consists of, or consists essentially of 11-17 wt % of the pigment. In some examples, the solids of the magenta liquid electrostatic ink composition comprises, consists of, or consists essentially of 15-25 wt % of the pigment.

In some examples, the solids of the magenta liquid electrostatic ink composition comprises, consists of, or consists essentially of up to 10 wt % of other additives, wherein the other additives comprise a charge adjuvant in an amount of less than 5 wt % of the total solids of the magenta liquid electrostatic ink composition, in some examples a charge adjuvant in an amount of less than 4.5 wt %, in some examples a charge adjuvant in an amount of less than 4.0 wt, in some examples a charge adjuvant in an amount of less than 4.0 wt %, in some examples a charge adjuvant in an amount of less than 3.5 wt %, in some examples a charge adjuvant in an amount of less than 3.0 wt %, in some examples a charge adjuvant in an amount of less than 2.5 wt %, in some examples a charge adjuvant in an amount of less than 2.0 wt % of the total solids of the magenta liquid electrostatic ink composition, in some examples a charge adjuvant in an amount of less than 1.5 wt % of the total solids of the magenta liquid electrostatic ink composition. In some examples, the other additives comprise a charge adjuvant in an amount of at least 0.5 wt % of the total solids of the magenta liquid electrostatic ink composition, in some examples at least 1 wt % of the total solids of the magenta liquid electrostatic ink composition.

Pigments

The electrostatic ink composition, either before or after having been printed on the print substrate, includes a pigment. The term "pigment" as used herein may indicate a particulate colorant, which may be any particulate colorant having in each molecule one or more aryl or heteroaryl rings, and the colorant may impart a color to an electrostatic ink composition, e.g. a color selected from magenta, violet, cyan, yellow and black. In some examples, the pigment in the electrostatic ink composition is a mixture of a plurality of pigments. In some examples, the pigment in the electrostatic ink composition is a mixture of a first pigment and a second pigment, and, in some examples, the first pigment is present in a greater amount, by weight, than the second pigment; and, in some examples, the first and second pigments are selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32. Either the pigment in the electrostatic ink composition is a magenta pigment, or the plurality of pigments together forms a magenta pigment. If a second, third, etc., pigment is present, the electrostatic ink composition and/or the ink printed on the print substrate includes a first pigment, a second pigment, a third pigment, etc., which are different from one another.

The pigment in the electrostatic ink composition is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

In some examples, the pigment in the electrostatic ink composition is a mixture of a plurality of pigments selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

In some examples, the pigment in the electrostatic ink composition is a mixture of a first pigment and a second pigment, wherein the first pigment is selected from pigment violet 19 type $\alpha^{II}$, pigment violet 19 type γ, pigment red 177 and pigment red 208, and the second pigment is selected from pigment violet 19 type $\alpha^I$, pigment violet 19 type β, pigment red 122 and pigment violet 32. In some examples, the first pigment is present in the electrostatic ink composition in a greater amount, by weight, than the second pigment.

In some examples, the pigment in the electrostatic ink composition is a mixture of a first pigment and a second pigment, wherein the first pigment is pigment violet 19 type $\alpha^{II}$ and the second pigment is selected from pigment violet 19 type $\alpha^I$, pigment violet 19 type β, pigment red 122 and pigment violet 32. In some examples, the first pigment is pigment violet 19 type $\alpha^{II}$ and the second pigment is pigment violet 19 type $\alpha^I$. In some examples, the first pigment is pigment violet 19 type $\alpha^{II}$ and the second pigment is pigment violet 19 type β. In some examples, the first pigment is pigment violet 19 type $\alpha^{II}$ and the second pigment is pigment red 122. In some examples, the first pigment is pigment violet 19 type $\alpha^{II}$ and the second pigment is pigment violet 32. In some examples, the first pigment is present in the electrostatic ink composition in a greater amount, by weight, than the second pigment.

In some examples, the pigment in the electrostatic ink composition is a mixture of a first pigment and a second pigment, wherein the first pigment is pigment violet 19 type γ and the second pigment is selected from pigment violet 19 type $\alpha^I$, pigment violet 19 type β, pigment red 122 and pigment violet 32. In some examples, the first pigment is pigment violet 19 type γ and the second pigment is pigment violet 19 type $\alpha^I$. In some examples, the first pigment is pigment violet 19 type γ and the second pigment is pigment violet 19 type β. In some examples, the first pigment is pigment violet 19 type γ and the second pigment is pigment red 122. In some examples, the first pigment is pigment violet 19 type γ and the second pigment is pigment violet 32.

In some examples, the pigment in the electrostatic ink composition is a mixture of a first pigment and a second pigment, wherein the first pigment is pigment red 177 and the second pigment is selected from pigment violet 19 type $\alpha^I$, pigment violet 19 type β, pigment red 122 and pigment violet 32. In some examples, the first pigment is pigment red 177 and the second pigment is pigment violet 19 type $\alpha^I$. In some examples, the first pigment is pigment red 177 and the second pigment is pigment violet 19 type β. In some examples, the first pigment is pigment red 177 and the second pigment is pigment red 122. In some examples, the first pigment is pigment red 177 and the second pigment is pigment violet 32.

In some examples, the pigment in the electrostatic ink composition is a mixture of a first pigment and a second pigment, wherein the first pigment is pigment red 208 and the second pigment is selected from pigment violet 19 type $\alpha^I$, pigment violet 19 type β, pigment red 122 and pigment violet 32. In some examples, the first pigment in the electrostatic ink composition is pigment red 208 and the second pigment is pigment violet 19 type $\alpha^I$. In some examples, the first pigment is pigment red 208 and the second pigment is pigment violet 19 type β. In some examples, the first pigment is pigment red 208 and the second pigment is pigment red 122. In some examples, the first pigment is pigment red 208 and the second pigment is pigment violet 32.

In some examples, the pigment in the electrostatic ink composition is selected from pigment violet 19 type $\alpha^{II}$ and pigment violet 19 type γ, and, in some examples, the electrostatic ink composition and/or ink printed on the print substrate lacks another pigment, i.e. the sole pigment(s) in the electrostatic ink composition is/are selected from pigment violet 19 type $\alpha^{II}$ and pigment violet 19 type γ, or a combination thereof. In some examples, the pigment in the electrostatic ink composition is pigment violet 19 type $\alpha^{II}$, and the electrostatic ink composition and/or ink printed on the print substrate lacks another pigment (other than pigment violet 19 type $\alpha^{II}$). In some examples, the pigment is pigment violet 19 type γ, and the electrostatic ink composition and/or ink printed on the print substrate lacks another pigment (i.e. other than pigment violet 19 type γ).

The electrostatic ink composition and/or ink printed on the print substrate may lack any types of pigment other than the pigment selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

In some examples, "lacks any types of pigment other than" includes in its meaning "substantially lacks any types of pigment other than". In some examples, "lacks any types of pigment other than" means that the solids of the electrostatic ink composition and/or ink printed on the print substrate comprises less 5 wt %, in some examples less than 3 wt %, in some examples less than 1 wt %, in some examples less than 0.5 wt %, in some examples less than 0.5 wt %, in some examples less than 0.1 wt %, in some examples less than 0.01 wt %, in some examples less than 0.001 wt %, of a pigment other than the pigment selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32. In some examples, "lacks any types of pigment other than" means that the electrostatic ink composition and/or ink printed on the print substrate lack entirely any types of pigment other than the pigment selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32.

In some examples, "lacks another pigment" (i.e. other than the one stated in the electrostatic ink composition) means "substantially lacks another pigment".

Pigment red 177 is known under the trade name Cromophtal Red A3B and Fastogen Super Red ATY-TR having CAS number 4051-63-2. Pigment red 208 is known under the trade name PV Red HF2B having CAS number 31778-10-6. Pigment red 122 is known under the trade name Fast Pink E having CAS numbers 16043-40-6 or 980-26-7.

Pigment violet 32 is known under the trade names of Benzimiazolone Violet or Bordeaux having CAS number 12225-08-0.

Pigment violet 19 is known under the trade name Quinacridone Violet 19 having CAS number 1047-16-1. Pigment violet 19 exists in four types: pigment violet 19 type $\alpha^I$, pigment violet 19 type $\alpha^{II}$, pigment violet 19 type β, and pigment violet 19 type γ, where $\alpha^I$, $\alpha^{II}$, β and γ are crystal phases, as described in Paulus, Erich F., Leusen Frank JJ, and Schmidt Martin U. "Crystal structures of quinacridones." *CrystEngComm* 9.2 (2007): 131-143, which is incorporated herein by reference in its entirety.

The pigment may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples, the pigment may constitute from 1 wt % to 50 wt % of the solids of the electrostatic ink composition, in some examples from 5 wt % to 40 wt % of the solids of the electrostatic ink composition, in some examples from 20 wt % to 40 wt % of the solids of the electrostatic ink composition, in some examples from 30 wt % to 40 wt % of the solids of the electrostatic ink composition, in some examples 25 wt % to 35 wt % of the solids of the electrostatic ink composition, in some examples 5 wt % to 20 wt % of the solids of the electrostatic ink composition.

The pigment is compatible with the liquid carrier and useful for electrostatic printing. The pigment may be insoluble in the liquid carrier of the electrostatic ink composition. For example, the pigment may be present as pigment particles, for example pigment nanoparticles, or may include a resin (in addition to the polymers described herein) and the pigment.

Liquid Carrier

The electrostatic ink composition includes a liquid carrier. In some examples, the chargeable particles including the resin may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for toner particles, i.e. the chargeable particles including the resin and, in some examples, a pigment. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIP- PON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The electrostatic ink composition includes a resin formable from polymerising alkylene monomers and methacrylic or acrylic acid monomers, which may be a thermoplastic resin. A thermoplastic polymer is sometimes referred to as a thermoplastic resin. The resin may coat a pigment, e.g. a pigment, such that the particles include a core of pigment, and have an outer layer of resin thereon. The outer layer of resin may coat the pigment partially or completely.

The resin includes a polymer formable from polymerising alkylene monomers, e.g. ethylene and/or propylene, and methacrylic or acrylic acid monomers. In some examples, the polymer of the resin may be selected from ethylene or propylene acrylic acid co-polymers; ethylene or propylene methacrylic acid co-polymers; co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); ethylene-acrylic acid ionomers and combinations thereof. The resin may further include other polymers, including, but not limited to, ethylene vinyl acetate co-polymers; co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethyl acrylate; polyesters; polyvinyl toluene; polyamides; styrene/butadiene co-polymers; epoxy resins; ethylene-acrylate terpolymers: ethylene-acrylic esters-maleic anhydride (MAH) or glycidyl methacrylate (GMA) terpolymers.

The resin formable from polymerising alkylene monomers and methacrylic or acrylic acid monomers may be termed a polymer having acidic side groups (the acid side groups being those of the methacrylic or acrylic acid monomers). Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™ Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the pigment constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Charge Director and Charge Adjuvant

The electrostatic ink composition includes a charge director. The charge director may be added to an electrostatic ink composition in order to impart and/or maintain sufficient electrostatic charge on the ink particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition. In some examples, the charge director imparts a positive charge on the particles of the ink composition.

In some examples, the charge director includes a sulfosuccinate moiety of the general formula [$R_{1'}$—O—C(O)CH$_2$CH(SO$_3^-$)C(O)—O—R$_{2'}$], where each of $R_1'$ and $R_2'$ is an alkyl group. In some examples, the charge director includes nanoparticles of a simple salt and a sulfosuccinate salt of the general formula MAn, wherein M is a metal, n is the valence of M, and A is an ion of the general formula [$R_{1'}$—O—C(O)CH$_2$CH(SO$_3^-$)C(O)—O—R$_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH$_4$, tert-butyl ammonium, Li$^+$, and Al$^{+3}$, or from any sub-group thereof. The simple salt may include an anion selected from the group consisting of SO$_4^{2-}$, PO$^{3-}$, NO$^{3-}$, HPO$_4^{2-}$, CO$_3^{2-}$, acetate, trifluoroacetate (TFA), Cl$^-$, BF$_4^-$, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further include basic barium petronate (BBP).

In the formula [$R_1$—O—C(O)CH$_2$CH(SO$_3^-$)C(O)—O—R$_{2'}$], in some examples each of $R_{1'}$ and $R_{2'}$ is an aliphatic alkyl group. In some examples, each of $R_{1'}$ and $R_{2'}$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is C13H27. In some examples, M is Na, K, Cs, Ca, or Ba. The formula [$R_1$—O—C(O)CH$_2$CH(SO$_3^-$) C(O)—O—R$_{2'}$] and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate.

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples in an amount of less than 2.0% by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

None of the types of charge director and charge adjuvant, for the purposes of this disclosure, constitute a pigment.

Other Additives

The electrostatic ink composition may include another additive or a plurality of other additives. The other additive or plurality of other additives may be added at any stage of the method. The other additive or plurality of other additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

None of the types of other additives mentioned above, for the purposes of this disclosure, constitute a pigment.

Printing Process and Print Substrate

In another aspect there is provided a print substrate having printed thereon an electrostatic ink composition comprising a resin, a charge director, and a pigment,
wherein the resin is formable from polymerising alkylene monomers and methacrylic or acrylic acid monomers, the pigment is selected from pigment violet 19 type $\alpha^I$, pigment violet 19 type $\alpha^{II}$, pigment violet 19 type β, pigment violet 19 type γ, pigment red 177, pigment red 208, pigment red 122 and pigment violet 32,
and, in some examples, the electrostatic ink composition lacks any other types of pigment.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

EXAMPLES

The following illustrates examples of the methods and other aspects described herein. Thus, these Examples should not be considered as limitations of the present disclosure, but are merely in place to teach how to make examples of the present disclosure.

Below are some examples of pigment chemistry families, together with an example of a pigment for each:

Quinacridone

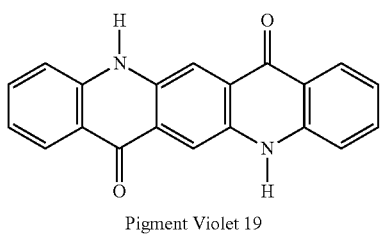

C.I. 73900

Pigment Violet 19

Anthraquinone

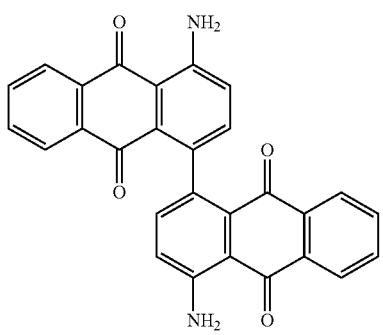

C.I. 65300

Pigment Red 177

Anthathrone
C.I. 59300
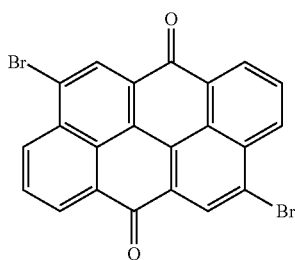
Pigment Red 168
Diketopyrrolopyrrole
C.I. 561150
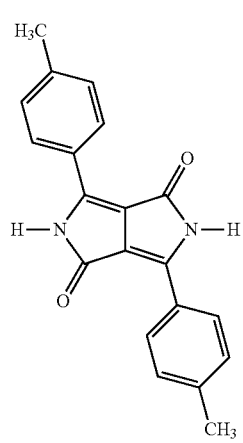
Pigment Red 272
Perelylene
C.I. 71130
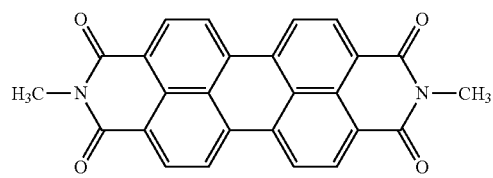
Pigment Red 179
Perinone
C.I. 71100
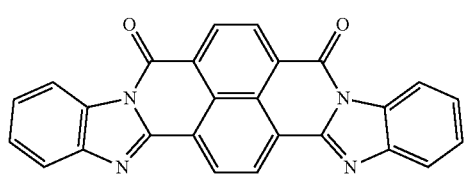
Pigment Red 194
Phtalein
C.I. 45410:2
Aluminium salt of
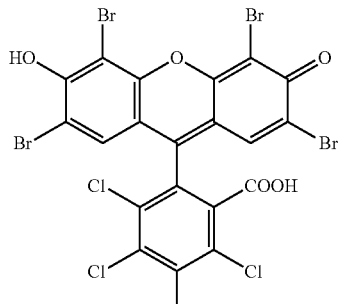
Pigment Red 174
Pyranthrone
C.I. 59710
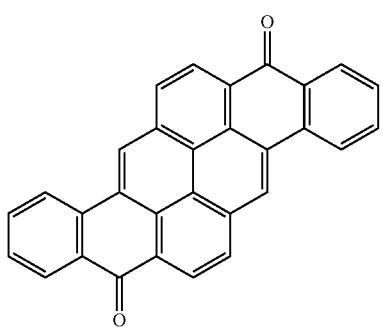
Pigment Red 216
Thioindigoid
C.I. 73312
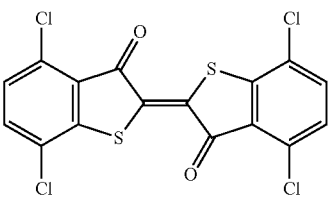
Pigment Red 88
Pyrazoloquinazolone
C.I. 12925
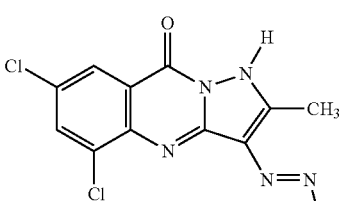
Pigment Red 251

Heterocyclic

2:1 Nickel complex of

C.I. 562700

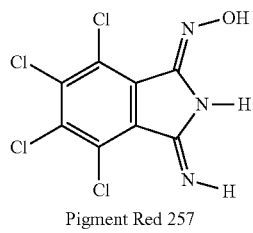

Pigment Red 257

Benzimidazolone

C.I. 12514

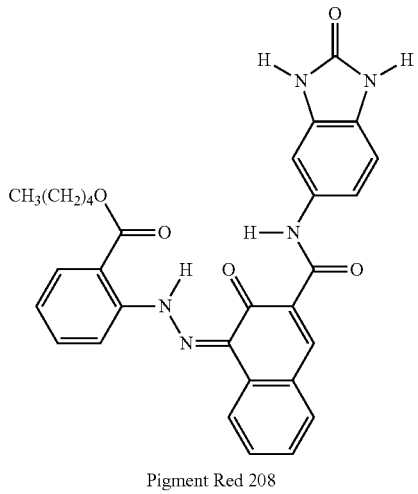

Pigment Red 208

In the above pigments, the conjugated system has many π-bonds that forms a dense structure. The π-bonds also provide delocalized electrons that can improve the charging stability of the ink.

The electrostatic ink compositions in these Examples are prepared in accordance with the following method. These electrostatic ink composition were produced using a lab grinding tool called attritor S1, by mixing the formulation as set out below in Table 1:

TABLE 1

| Magenta | Wt % solids |
|---|---|
| Resins | 42-78.9 |
| Pigment(s) | 20-50 |
| VCA | 1-5 |
| DS72 | 0.1-3 |
| Sol-L | |
| % NVS atr. | 24.00% |
| Total weight atr. | 2300 |

The 'Resins' used in the above were Nucrel 699, available from DuPont, and A-C 5120, available from Honeywell, in the weight ratio of 4:1.

The pigments used were the pigments mentioned below. In the reference ink, the following pigments were present: a primary pigment, pigment red 146, an azo red pigment, pigment red 185 and a secondary pigment, pigment red 122, which is a bluish-red pigment with quinacridone chemistry.

VCA indicates an aluminium tristearate and palmitate salt, available from Riedel de-Haan.

DS72 is a silica powder, available under the trade name Aerosil R 7200 from Degussa-Evonik.

Sol-L indicates Isopar L, an iso-parfinic oil manufactured by EXXON.

This ink is then diluted to 2% NVS, using further Isopar L, and then the following additives added, as shown in Table 2:

TABLE 2

| W-12 | SCD* | SVM | SE-15 | Marcol | HPB |
|---|---|---|---|---|---|
| 1-6% W12/ink solids | 1-20 mg SCD/g solids | 0.001-0.1 mg SVM300/gr Sol-L | 0.001-0.01 mg SE15/gr Sol-L | 2-15 mg M-1/gr Sol-L | 2-8% on solids |

The grinding in production tool was carried out in two steps:
i) Hot stage—50-57° C. for 20 hour up 50 hour (with no cold stage).
ii) Cold stage—36-45° C. for 4 hour up to 20 hour.
W12 is a Teflon powder.
SCD is synthetic charge director, being a barium bis sulfosuccinate salt as described in US 2009/0311614 or WO2007130069.
SVM is high viscous, 300 kcSt, Silicon oil, available under the trade name SIG5840 from ABCR. (present in EI 4.0, but not in EI 4.5).
SE-15 is a defoamer silicon additive, available under the trade name KSG-15 from ShinEtsu. (present in EI 4.0, but not in EI 4.5).
Marcol is a high viscous paraffinic oil with a viscosity of 0.83 gr/cc. Amount for EI4.0 shown in table; for EI 4.5 it was reduced to 0.5 mg/1 gr Isopar.
HPB indicates an homopolymer polyethylene wax, available under the trade name Acumist B6 from Honeywell company.
In the following examples, Blue Wool Scale (BWS) is a scale used in textile industry for the fading of colorized clothes. 8 strips colorized in blue are put in different levels from light to dark blue. These strips are also put in the test together with the tested sample and the change in the sample is compared to the change in each strip. The grade given to the sample is matched to the test strip that changed in color or faded the same as the sample.
In the following examples, VCA is an Al stearate/palmitate salt added during grinding as a dispersant to improve grinding efficiency and serves mainly as a charge adjuvant for the interaction with charge director and formation of charging under electrical field application.

Example 1

Electrostatic inks were prepared according to the general procedure detailed above. The pigments used in each of the inks prepared in this Example can be found on the x-axis of FIG. 1, on which 'PR' indicates pigment red, 'PV' indicates pigment violet. The various types of pigment red and pigment violet are indicated by the number following PR or PV. Additionally, on the x-axis of FIG. 1, 'BWS1', 'BWS2', 'BWS3', etc, indicate, respectively, Blue Wool Standard 1, Blue Wool Standard 2, Blue Wool Standard 3, etc. These electrostatic inks were printed using an HP Indigo 7600 Digital Press, on both synthetic substrate (Jolybar PET (polyethylene terephthalate treated by Hanita coating which is an acrylic based coating), 175 μm) and a paper substrate (Arjo Wiggings Graphic 300 gsm). The printed electrostatic inks were then exposed to direct sunlight under real outdoor conditions and also put into a fading machine for an accelerated fading test. Each printed electrostatic ink was compared with the reference magenta and also compared using BWS strips to provide a measurement of change in that scale, as well as change in color and optical density (OD), using an ANSI-A filter spectrophotometer. FIG. 1 shows results of the synthetic samples in both accelerated (left-hand bar) and real-time tests (right-hand bar). The electrostatic ink pigments are ordered based on their results in BWS grading.

Blue Scales Textile Fading Cards (the strips) were manufactured by Gaylord company. Blue Scales Textile Fading Card is a standard method of testing for the effects of light on paintings, textiles and documents while on display. Eight pieces of wool cloth tinted with blue dyes of different degrees of light fastness are mounted on a card. The cloth #1 contains a dye which is very unstable to light; cloth #8 is very stable. The cards were used as a control during the lightfastness experiment.

Figure 2:
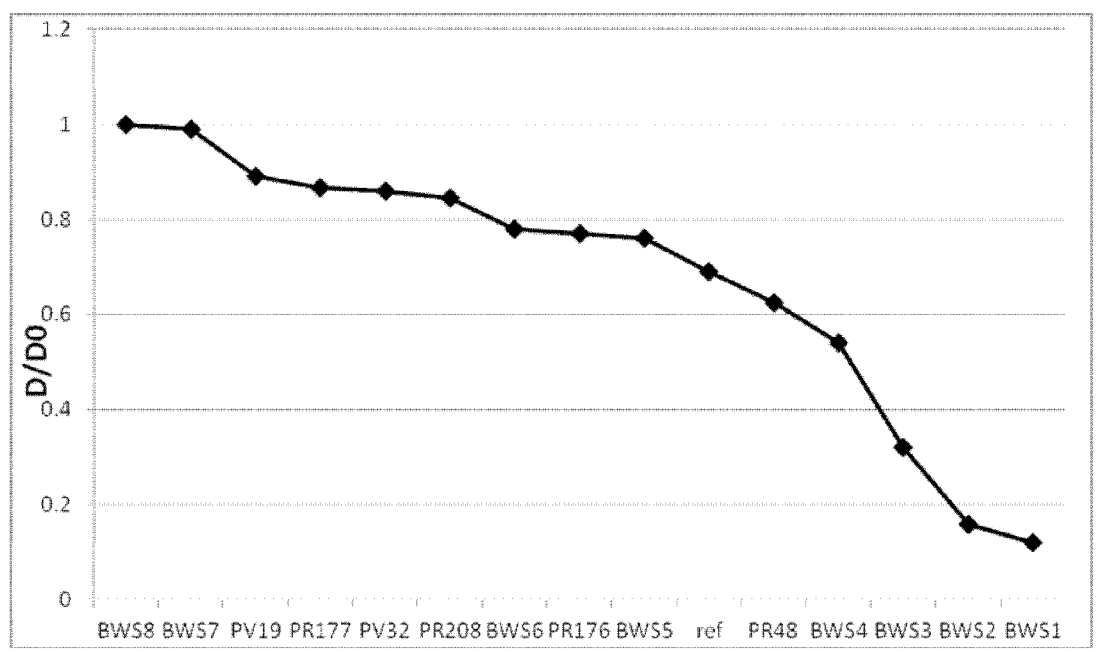
FIG. 2 shows the light fastness results of the printed electroinks using the alternative red pigments tested in the fading machine with no spray cycle (method as for Example 1).
Figure 3:
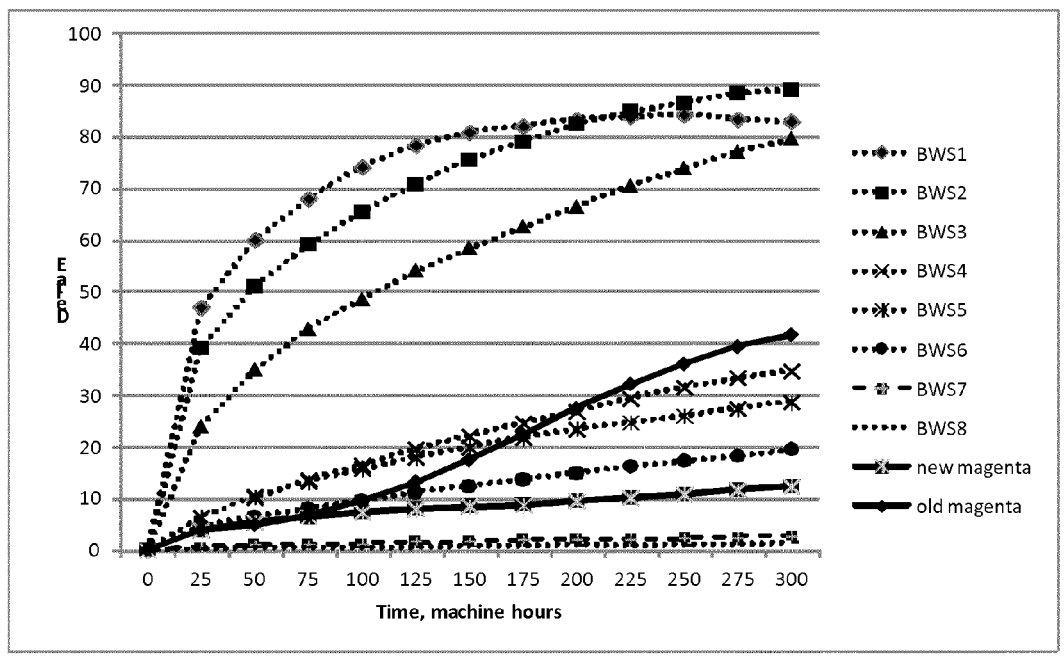
FIG. 3 shows the light fastness of the electrostatic ink of Example 4, called 'new magenta' vs. the control (called 'old magenta'), in particular the change in color for each of the BWS cards running in an accelerated test for 300 h of the electrostatic ink of Example 4 ΔE in a fading machine.

The data shown in FIG. 1-3 show the results of two tests: accelerated light fade test, and real-time environmental exposure test. The conditions of the test are described below.

In accelerated lightfade test, the samples were subjected to irradiation of Xe-Arc lamp using a Ci3000 Atlas Weatherometer, with dark and light cycles as described below in Table 3.

TABLE 3

| Program | Segment | Event | Time (min) | BPT (° C.) | Air T (° C.) | RH (%) | Irradiance (W/m$^2$) | Filters |
|---|---|---|---|---|---|---|---|---|
| Outdoor (SAE J2527) | 1 | Dark + Spray | 60 | 38 ± 3 | 38 ± 3 | 95 ± 5 | 0 | Atlas Weather-Ometer: Quartz/ Borosilicate Type S |
| | 2 | Light | 40 | 70 ± 3 | 47 ± 3 | 50 ± 5 | 0.55 @ 340 nm | |
| | 3 | Light + Spray | 20 | 70 ± 3 | 47 ± 3 | 50 ± 5 | 0.55 @ 340 nm | |
| | 4 | Light | 60 | 70 ± 3 | 47 ± 3 | 50 ± 5 | 0.55 @ 340 nm | |

The total exposure time for the samples was 225-300 hours.

In real time test, the samples were continuously exposed to light outdoors in San Diego Calif. in March-June 2013, at 45 degree angle to horizon. The data in FIG. 1 show the color change after 10 weeks of continuous exposure.

The color change in both experiments was characterized using an X-Rite Spectrolino, by measuring the color coordinates, L*, a*,b* at D65 2 degree condition, as well as ANSI A Optical density. The color change was defined as the Δ E, and as an optical density ratio, as described in the following equation:

$$\Delta E = \sqrt{(a^* - a_0^*)^2 + (b^* - b_0^*)^2 + (L^* - L_0^*)^2}$$

$$R = \frac{D}{D_0}$$

where L* and L*$_0$, a* and a*$_0$ and b* and b*$_0$ are the color coordinates after and before exposure, for 100% colorant patches and for the blue wool cloths; D and D$_0$ are the ANSI A optical densities after and before exposure. Here the ANSI A green filter settings were used for the magenta patches and the red filter settings for the blue wool cloths.

FIG. 1 shows that, with the synthetic substrate, there is a large group of pigments that achieve BWS=7-8. The accelerated results (left-hand bars) correlate roughly to the real-time results (right-hand bars). The magenta reference achieved a grade of BWS=6 which is within the wanted target for light fastness permanence while the most permanent pigments achieved a much higher permanence (ΔE=7 vs ΔE=26 for reference magenta). Due to flaking problems observed in the paper samples left outside in rain, which then dried and cracked, it was decided to check the printed electrostatic inks in a fading machine that did not include a spray cycle. With magenta paper samples, the paper tends to yellow affecting ΔE measurement. It was observed that ΔOD is more sensitive and therefore was related to the change in optical density for these samples rather than ΔE.

Example 2

FIG. 2 shows the light fastness results of the printed electrostatic inks using the alternative red pigments tested in the fading machine with no spray cycle (method as for Example 1). In previous work it had been observed that the paper sample was preserved and ready for color check. That is to say that the new fading procedure without a spray cycle was found to be good with no damage to the sample. So, the most sensitive parameter to indicate the level of fading in paper sample was sought, whereas in synthetic sample no significant fading was observed. FIG. 2 shows that Optical Density was found to be a more sensitive parameter mainly due to paper yellowness that influences more the color coordinates.

Due to the severe fading of a paper sample compared to a synthetic one, it was logical to check improvement in permanence with the new alternative pigments used in the printed electrostatic inks in paper samples.

FIG. 2 shows that the electrostatic ink using the reference magenta achieved a grading of BWS=4, while for the Benchmark test it achieved BWS=3 in real conditions. The Benchmark test aimed to give the fastness of Indigo electrostatic inks to light, heat and ozone concentration. Synthetic and paper printed samples of CMYK and OVG colors were checked for indoor and outdoor Light fastness, thermal and ozone fading.

This again shows some difference between the harsh conditions in real direct exposure to sunlight against those applied in the accelerated test. FIG. 2 shows a small group of pigments which achieve BWS=6 and above (higher permanence), for example PV19, PR177, PV32 and PR208. Similarly, for synthetic samples, PV19 (that contain the average result for pigment grades received sometimes from different suppliers), and PR177 are permanent pigments which show good, repeatable results.

Example 3

The optical spectra of the pigments that showed the best permanence in Examples 1 and 2 for synthetic and paper samples were measured, and the next stage was to build a new set of pigments which, ideally, color-matched the target color of reference magenta. For the primary pigment for the magenta light fastness ink of this Example, PV19 was chosen, in different grades from several suppliers, all containing the red colors as type $\alpha^{II}$ and type γ. PR177 was supplied by BASF and PR208 was supplied by Clariant. Each was used independently as a primary pigment, in some cases, with some secondary bluish pigments, such as PR122 (that contains Quinacridone chemistry), PV32 (that has Benzimiazolone chemistry) and PV19 (type $\alpha^{I}$ and type β). Although the magenta is not red, but rather a bluish-red color, the primary pigment can be red (at most bluish-red) while the secondary pigment will compensate for the remaining blue hue needed. The inventors have shown that by using PV19 type $\alpha^{II}$ and type γ, magenta hue can be obtained only by using one of these pigments without the need for an additional secondary pigment. With other good light fast pigments like PR177 or PR208, it was found that these red pigments benefited from a secondary red bluish pigment to drift the hue toward a magenta hue.

Using a spectrophotometer and appropriate software, various color parameters of the printed inks containing the reference and new pigments, individually and in combination, were compared. For the inks containing the new pigments, the software calculated the difference in color (L, a*, b* coordinates and also Munsel polar coordinates of chroma and hue) between the reference pigment and the new pigments. An overall comparison of ΔE is given, together with the other desired parameters (L, a*, b*, chroma and hue).

This method indicated that the PR177- and PR208-containing inks, while a reasonably close color match, are a bit redder than the reference and provide a suitable ΔE of approximately 2-3. Further it was observed that, when using a single pigment (at least for a few grades) of PV19, a small ΔE is achieved. Since this pigment was cheap, provided the best lightfastness, closest color for a single pigment, and gave no significant problems in basic checks (charging, print quality etc), the two grades of PV19 from Sun Chemical which had provided the lowest pigment loading (the first grade was Fastogen Super Red 500 RG 228-0500, the second grade was Quindo Red 19 2280044) were proceeded with. They both have gamma crystal structure and were provided in powder form. They formulated two new magenta electrostatic inks, one with each of the two grades of PV19 from Sun Chemical, and obtained ΔE=2 for each of them. ΔE=2 is within the production specification for magenta electrostatic ink. At that stage the formulation consisted 3% VCA, charging additive, a pigment loading of 28.69% of total ink solids and 18% solids in the grinding formulation. The formulation was then changed to 2% VCA to get the precise charging point on press.

Example 4

The color gamut at the desired optical density was then measured and compared to the reference magenta color gamut. The electrostatic ink of Example 3 obtained a 5% higher color gamut compared to the electrostatic ink using reference magenta. Still, mixing with cyan shifted the mixed color to higher ΔE compared to reference magenta. Re-checking the light fastness for the electrostatic ink of Example 3 provided the expected results of BWS=6-7 on paper while on synthetic substrate like PET a BWS=8 was achieved. FIG. 3 shows the light fastness of the electrostatic ink of Example 3 vs. the control (reference magenta), in particular the change in color for BWS cards running in an accelerated test for 300 h of the electrostatic ink of Example 3 ΔE in a fading machine. Comparing the BWS cards put into the test, the electrostatic ink of Example 3 achieves BWS=6.

It is explained above that the Blue Wool Scale cards are 8 strips colorized in blue in different color intensity from light blue, strip 1, to most intense one, strip 8. The more strip is intense blue the more it is more permanent to light fastness fading. The fading for each strip is given in deltaE, change in color from time=0. The change in the testing sample is compared to the different changes in color in each strip, the largest change in strip 1 and the smallest in strip 8. It gets BWS grading when the change in color equals the change in color in one the strips.

Example 5

As well as achieving color and an improvement in light fastness, it was observed that the electrostatic ink of Example 3 (containing PV19 type γ as the sole pigment) is more chargeable than the electrostatic ink using reference magenta, targeting a lower conductivity set point on the press which can, in some circumstances, make it difficult for controlling the charging and its output, optical density. Thus, after iteration, it was found that lowering the % VCA to 2 wt % solids gave an acceptable conductivity set point. The grinding characteristics, mainly for color development, showed a 'sinusoidal' trend when lowering the VCA to 1 wt % solids and less in 2 wt % solids VCA. Using an electrostatic ink of Example 3 having 28.69 wt % pigment loading, the DMA (amount of mass per area) saw an increase of 25% (correlating to lab checks that indicated lower color development). When increasing the pigment loading to 35 wt %, the DMA was at least as low as the electrostatic ink using reference magenta, if not lower, within an error margin of a few percent. This suggests that higher pigment loading leads to a thinner ink layer on press.

While the electrostatic ink composition and related aspects have been described with reference to certain examples, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim can be combined with the features of any of the other dependent claims, and any independent claim.

The invention claimed is:

1. A magenta liquid electrostatic ink composition, comprising:
   chargeable particles comprising a resin and a pigment;
   an insulating, non-polar, non-aqueous liquid carrier in which the chargeable particles are dispersed; and
   a charge director;
   wherein:
       the resin is formable from polymerizing alkylene monomers and methacrylic or acrylic acid monomers;
       the pigment is a mixture of pigment violet 19 type γ and a second pigment selected from pigment violet 19 type $\alpha^{I}$ and pigment violet 32; and
       the liquid electrostatic ink composition lacks any other types of pigment.

2. The magenta liquid electrostatic ink composition according to claim 1 wherein the total solids of the magenta liquid electrostatic ink composition consist of:

a) 1-45 wt % of the pigment;
b) 40-90 wt % of one or more resins;
c) 0.0001-20 wt % of one or more charge directors; and
d) optionally, up to 10 wt % of other additives, wherein other additives lacks any other types of pigment.

3. The magenta liquid electrostatic ink composition according to claim 1, wherein the magenta liquid electrostatic ink composition further comprises a charge adjuvant in an amount of less than 5 wt % of the total solids of the magenta liquid electrostatic ink composition.

4. A method of electrostatic printing, the method comprising:
   a) providing a magenta liquid electrostatic ink composition according to claim 1;
   b) contacting the electrostatic ink composition with a latent electrostatic image on a surface to create a developed image; and
   c) transferring the developed image to a print substrate.

5. The magenta liquid electrostatic ink composition according to claim 1, wherein the pigment is present in an amount ranging from 1 wt % to 28.69 wt %, based on a total weight of the total solids of the magenta liquid electrostatic ink composition.

6. The magenta liquid electrostatic ink composition according to claim 1, further comprising aluminum tristearate and a palm itate salt.

7. The magenta liquid electrostatic ink composition according to claim 1, wherein the charge director is selected from the group consisting of polybutylene succinimides and glyceride salts.

8. The magenta liquid electrostatic ink composition according to claim 1, wherein the insulating, non-polar, non-aqueous liquid carrier includes an aliphatic hydrocarbon, an isomerized aliphatic hydrocarbon, a branched chain aliphatic hydrocarbon, an aromatic hydrocarbon, an isoparaffinic compound, a paraffinic compound, or a dearomatized hydrocarbon compound.

* * * * *

UNITED STATES PATENT AND TRADEMARK OFFICE
CERTIFICATE OF CORRECTION

PATENT NO.        : 10,042,277 B2                                    Page 1 of 1
APPLICATION NO.   : 15/314362
DATED             : August 7, 2018
INVENTOR(S)       : Gil Bar-Haim et al.

It is certified that error appears in the above-identified patent and that said Letters Patent is hereby corrected as shown below:

In the Claims

In Column 28, Line 7 (approx.), in Claim 6, delete "palm itate" and insert -- palmitate --, therefor.

Signed and Sealed this
First Day of January, 2019

Andrei Iancu
*Director of the United States Patent and Trademark Office*